Nov. 1, 1966 W. JONES 3,282,116
APPARATUS FOR DETERMINING THE DIMENSIONS, WEIGHT
AND DENSITY OF OBJECTS
Original Filed March 14, 1961 7 Sheets-Sheet 1

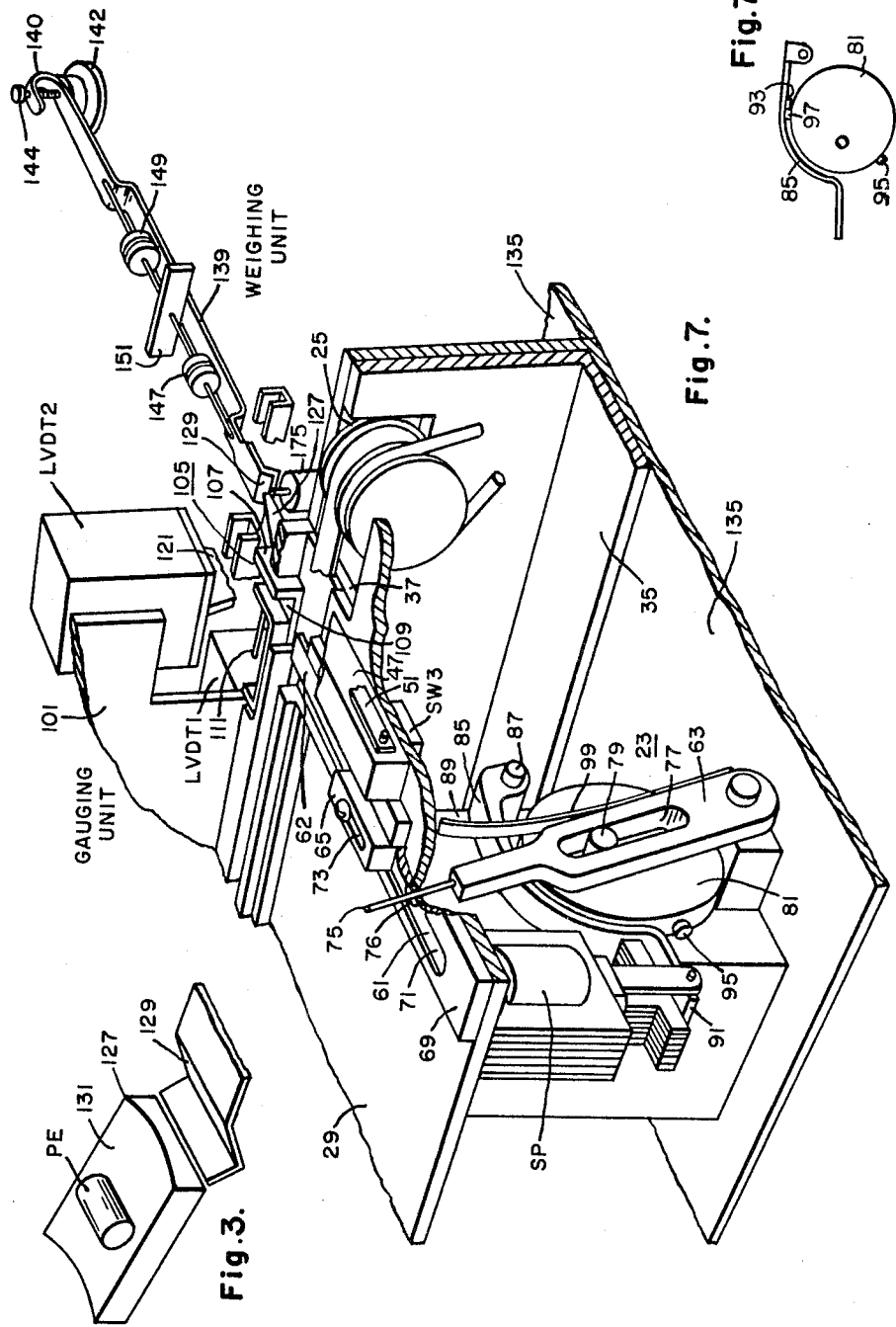

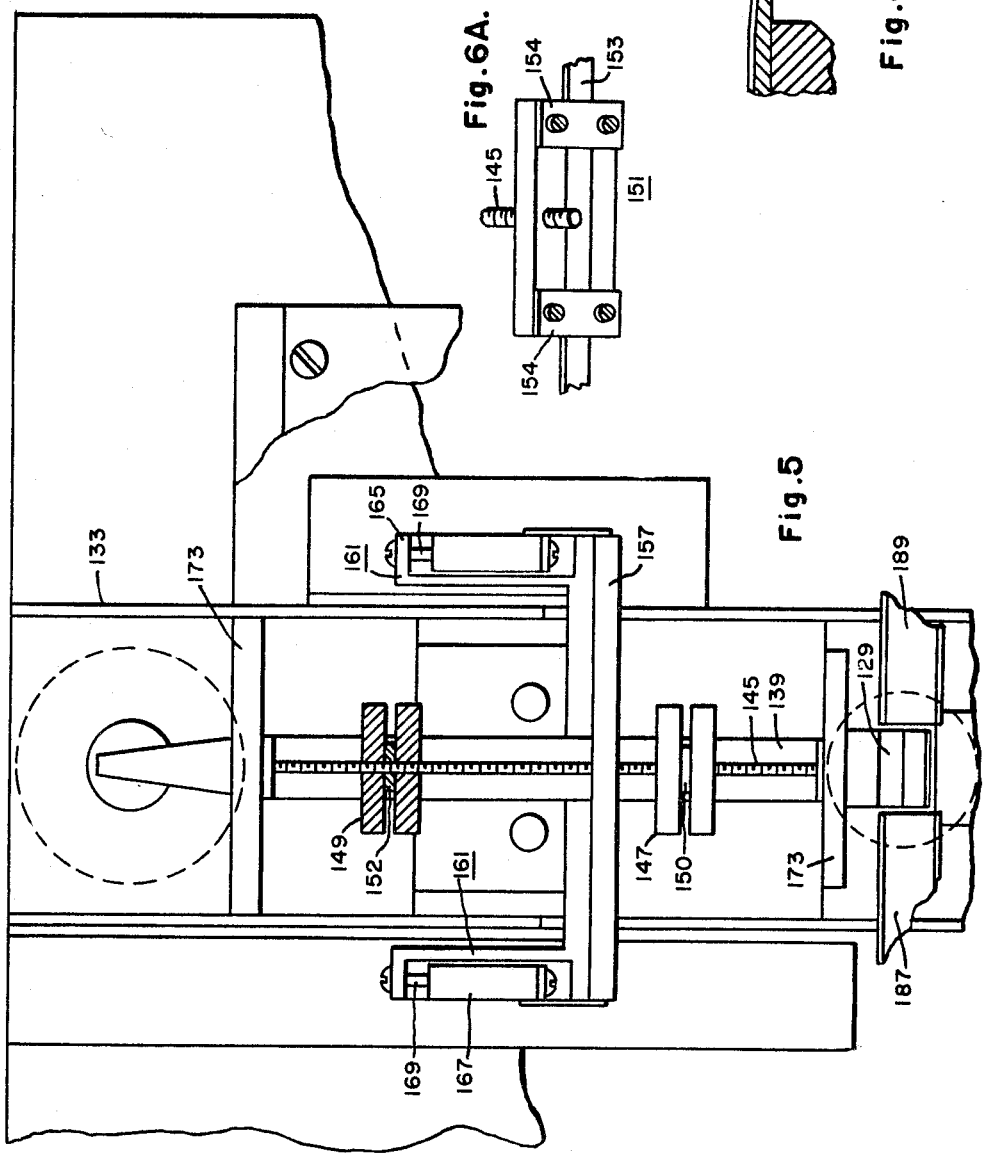

United States Patent Office 3,282,116
Patented Nov. 1, 1966

3,282,116
APPARATUS FOR DETERMINING THE DIMENSIONS, WEIGHT AND DENSITY OF OBJECTS
Wallace Jones, Saltsburg, Pa., assignor to Nuclear Materials and Equipment Corporation, Apollo, Pa., a corporation of Pennsylvania
Original application Mar. 14, 1961, Ser. No. 108,220, now Patent No. 3,221,152, dated Nov. 30, 1965. Divided and this application Dec. 2, 1964, Ser. No. 423,886
8 Claims. (Cl. 73—433)

This application is a division of application Serial No. 108,220, filed March 14, 1961 for Classification Method and Apparatus, now Patent No. 3,221,152.

This invention relates to the measurement art and has particular relationship to the determination of the dimensions, weight and density of objects.

Nuclear reactors include fuel assemblies, the basic fuel element of which is a small pellet of a fissionable material. In the use of such pellets for fuel, it is necessary to determine their dimensions, weight and density and it is an object of this invention to accomplish this purpose.

In achieving this object a pellet is advanced into a gauging station where its dimensions are gauged and it is then advanced into a weighing station where it is weighed. It is an object of this invention to provide apparatus for carrying out this advancing operation for each pellet in its turn without scattering the pellets out of the prescribed channel. It is an incidental object of this invention to provide a channel for advancing articles or objects, such as cylindrical neutronic pellets, while maintaining one dimension of each article, for example, the axis of each pellet, generally perpendicular to the direction of movement.

The pellets to which this invention is particularly applicable are small circular cylinders. In this case the determinative dimensions to be gauged are the length and the diameter of each pellet. In accordance with the specific aspects of this invention the length and diameter of each pellet are gauged by caliper-like elements in the gauging station. The dimensions and volume of the pellets are set by operation of linear variable differential transformers on variable impedances responsive to the gauging operation. The weight is measured by a scale on which the movement of the weighing arm is measured by a linear variable differential transformer.

It is essential for economy reasons that the processing of the pellets be automated to the extent practicable and this is achieved in accordance with a further aspect of this invention by a processing system for automatically advancing, gauging, weighing and selecting the pellets. An important inventive feature of this system are the provisions which it includes so prevent improper turning of the pellets as they advance.

The pellets are usually small elongated cylinders (but may have other forms, for example, cubical) and are delivered by a conveyor belt provided with suitable guides so that the axes of the pellets are maintained parallel to the direction of advance. The gauging and weighing mechanisms are aligned at right angles to the direction of advance and an indexing mechanism is provided to move each pellet in its turn into the gauging station. The pellets are moved into the gauging station with their axes at right angles to their direction of movement. The gauge has a caliper which is normally held in gauging position; that is, with its movable jaw set to be pushed back to correspond to the length of the pellet which is injected between the jaws. The gauge also has a caliper with a movable jaw above the station in engagement with which the pellet is injected when it is moved into the gauging station.

When a pellet has been gauged the indexing mechanism imparts an impact to it causing it to roll down a channel or guide into a weighing-scale pan at a lower level than the gauge. A feature of this invention in its specific aspects is that this guide is concaved upwardly forming a groove in the form of a cylindrical arc along which the pellet rolls. The concavity prevents the pellet from turning.

An ejector is provided which extends into the pan and moves the pellet either into an accept channel or a reject channel depending on its properties.

The invention in detail, both as to its organization and as to its method of operation, together with the objects and advantages thereof, will be understood from the following description of specific embodiments of this invention taken in connection with the accompanying drawings, in which:

FIG. 3 is a fragmental view showing the channel between the Gauging Unit and the Weighing Unit of the apparatus shown in FIG. 2;

FIG. 4 is a fragmental view in side elevation showing the scale pan of the Weighing Unit and its associated balancing coil;

FIG. 5 is a view in top elevation of the weighing scale of the apparatus shown in FIG. 2;

FIGS. 6A and 6B are fragmental views showing details of the Weighing Unit;

FIG. 7 is a view in isometric of the apparatus of FIG. 1 showing the mechanism for advancing the pellets into the Gauging Unit and into the Weighing Unit;

FIG. 7A is a fragmental view showing in detail a mechanism of FIG. 7; and

Figure 8A:
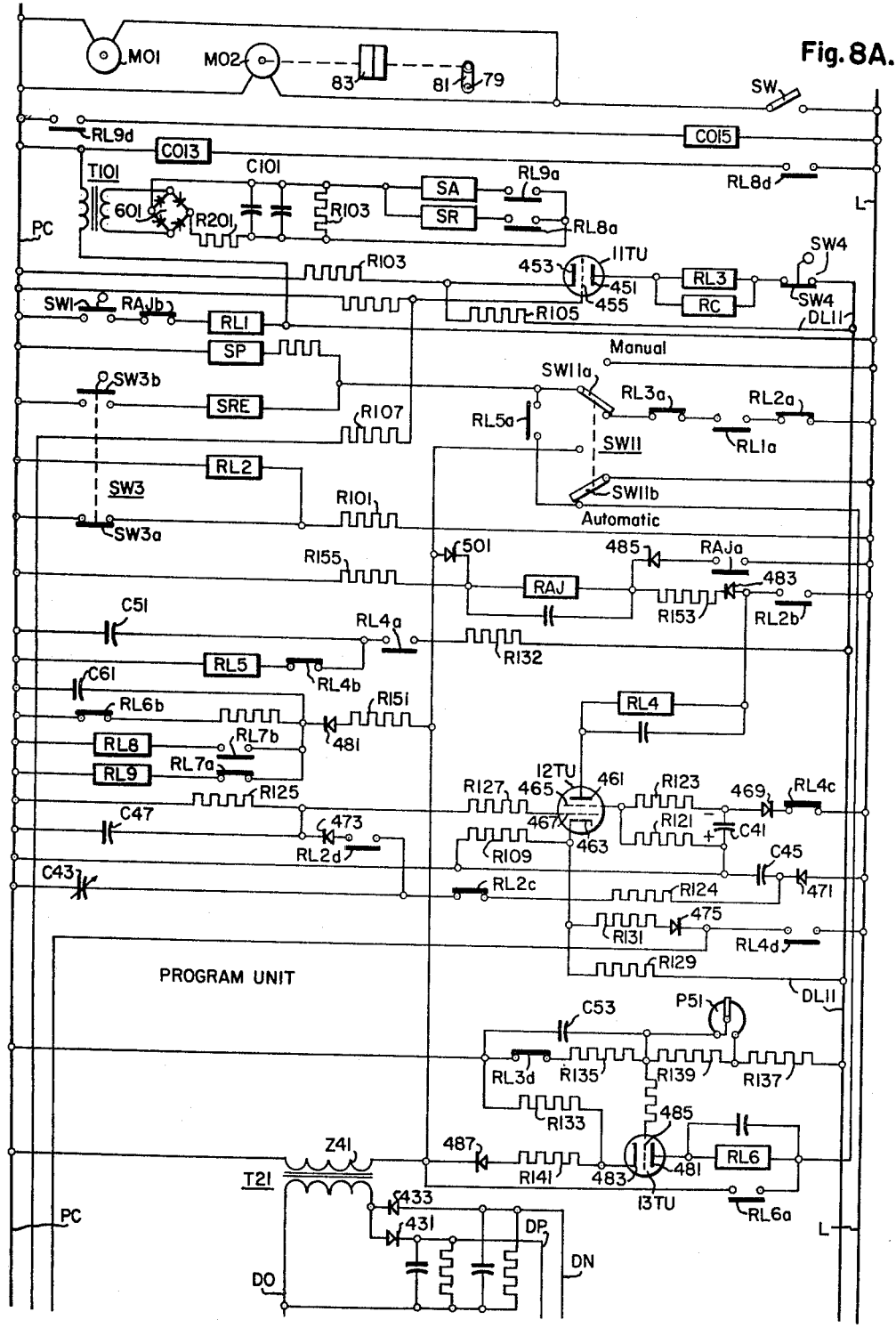
Figure 8B:
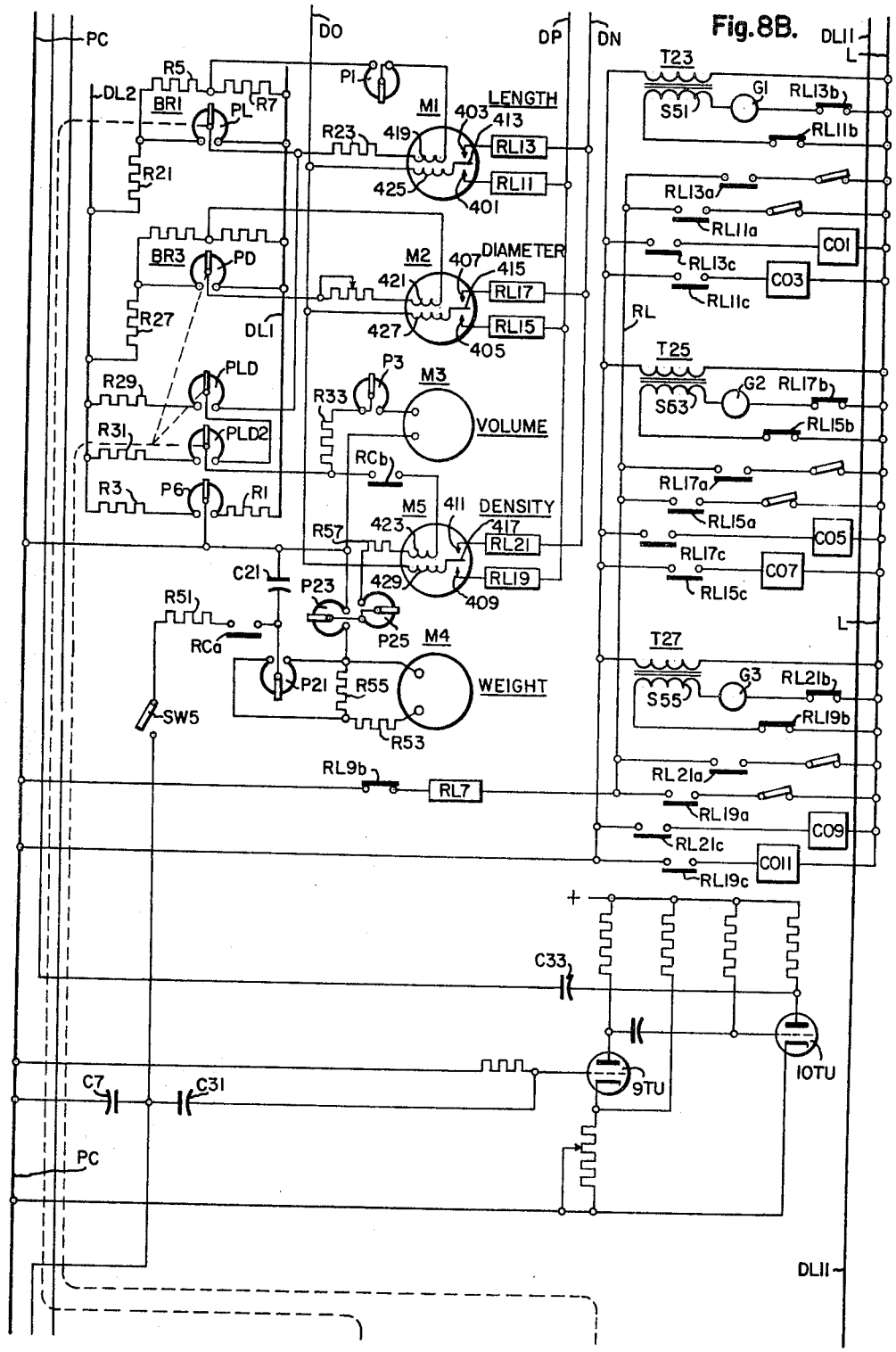
Figure 8C:
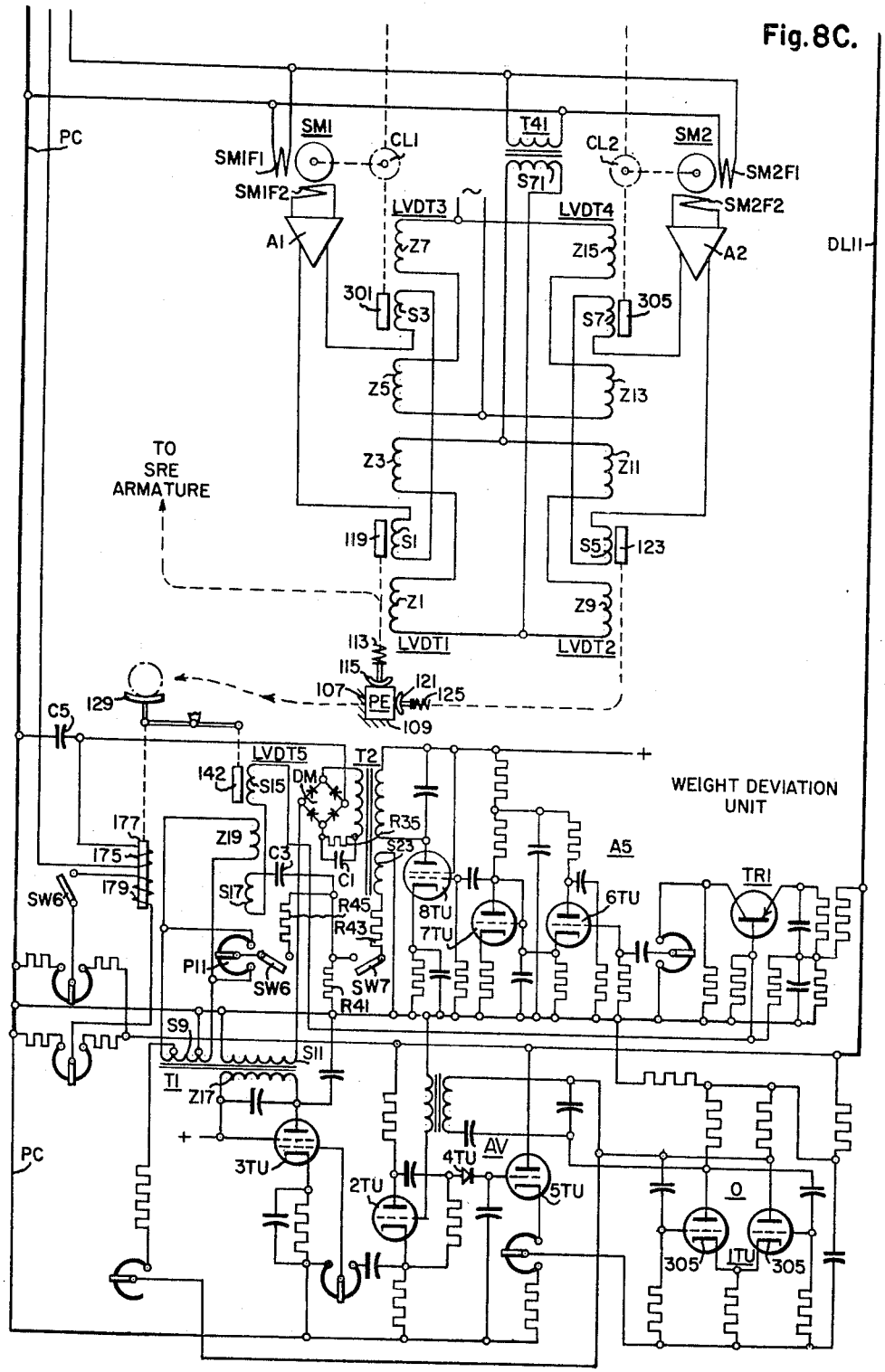

FIGS. 8A, 8B, 8C together constitute a schematic showing the electrical circuit of the apparatus according to this invention.

Figure 1:
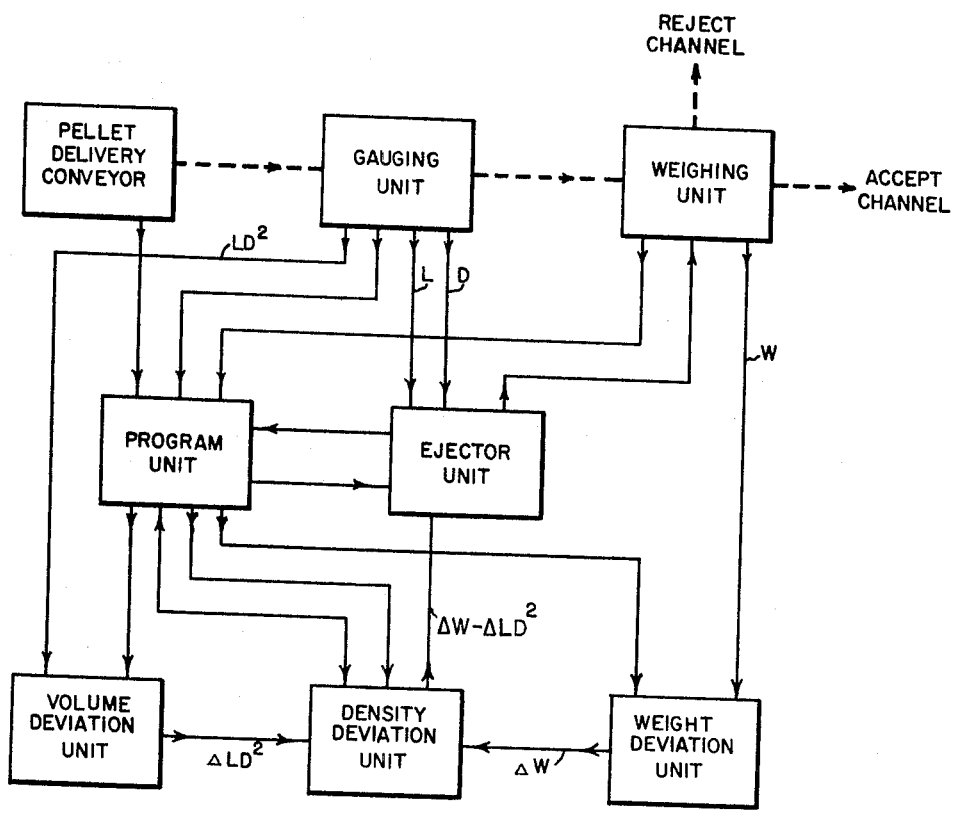
FIGURE 1 is a block diagram showing the principal components of apparatus according to this invention and with which this invention is practiced and their mechanical and electrical relationship.

In FIGS. 1 through 8C this invention is illustrated as applied to the processing of generally cylindrical fuel pellets for nuclear reactors. FIG. 1 shows the components of the apparatus according to this invention as blocks. The broken line arrows between the blocks present the mechanical movement of the pellets; the full-line arrows the flow of electrical information.

The pellets PE (FIG. 2) are delivered by a Pellet Delivery Conveyor to the Gauging Unit where the diameter, D, and the length, L, are measured and $LD^2$ is computed. From the Gauging Unit the pellets are delivered to a Weighing Unit where each pellet is weighed. From the Weighing Unit each pellet is transferred either to an Accept channel or to a Reject channel depending on the operation of the Ejector Unit.

The Ejector Unit operates on each pellet after the weighing operation and its operation depends on the electrical information which it receives. The Gauging Unit sets the Ejector Unit to reject, through information channels L or D if L or D respectively exceed preset limits. In addition the Gauging Unit sends the product $LD^2$ for each pellet to the Volume Deviation Unit where the product is compared with the similar product for a standard. The volume deviation $\Delta LD^2$ thus derived is transmitted to the Density Deviation Unit.

The operation in the Weighing Unit leads to the transfer of weight information for each pellet to the Weight Deviation Unit which transfers the weight deviation $\Delta W$ to the Density Deviation Unit. The latter calculates the density deviation, $\Delta W - \Delta LD^2$, and transfers information to the Ejector Unit if the density deviation exceeds preset limits.

If the Ejector Unit receives no information of exceeded limits for length, diameter or density deviations it ejects the pellet into the Accept Channel; if the Ejector Unit receives information that L, D or $\Delta W - \Delta L D^2$ depart from preset limits it ejects the pellet into the Reject Channel. The sequencing of the mechanisms which move the pellets PE through the Gauging Unit and Weighing Unit and which operate the Ejector Unit at the proper time is controlled by the Program Unit. The Program Unit also operates to prevent the jamming of the pellets PE in the Gauging Unit.

The Pellet Delivery Conveyor (FIG. 2) includes a continuous belt 21 for moving the pellets PE to a position where they are advanced to the Gauging Unit and an indexing mechanism 23 for advancing them into the Gauging Unit from this position. The belt 21 is driven from a motor MO1 (FIG. 8) through pulley 25 (FIG. 7) at one end of its path and passes over pulley 27 (FIG. 2) at the other end of its path.

Strips 39 extend parallel along the path of the belt 21. The distance between the inner edges of the strips 39 is just greater than the width of the belt 21 so that the belt moves freely between them. Rails 41 are secured (for example by welding) to the strips so that they overhang the strips and extend over the belt 21. The pellets PE move in direction parallel to their long dimensions (axis) and the rails 41 serve the double purpose of holding down the belt and aligning the pellets PE.

The Gauging Unit communicates with the belt 21 through an entrance or channel 43 (FIG. 2) along which the pellet PE is moved at right angles to its motion along the belt. At the entrance 43 a stop assembly 45 is provided just over the belt 21. This assembly includes a bar 47 of insulating material generally at right angles to the belt 21 and extending over the belt. An angle 49 of insulating material extends over the end of the bar 47 over the belt 21 overhanging the bar 47 at the end remote from the pellet channel 43. A spring 51 is mounted along the side of the bar 47 remote from the pellet channel 43. This spring 51 is the operating member of a switch SW1 (FIG. 2) which is actuable by each pellet PE as it approaches the entrance 43.

The spring 51 extends over the belt 21 opposite an opening 53 in the bar 47 and carries a pin 55 (FIG. 2) which extends through the opening 53 and is actuable by each pellet PE as it is advanced to a position opposite channel 43. The spring 51 also carries a contact tip 57 adapted to engage a cooperative contact 59 (FIG. 2) when the spring 51 is actuated by a pellet PE. The tip 57 and the contact 59 together constitute switch SW1. The closing of the switch SW1 by a pellet signals that a pellet is in a position to be injected into the Gauging Unit.

The indexing mechanism 23 (FIG. 2) includes a slider 61 which is reciprocated from a scotch yoke 63 (FIG. 7). The slider 61 is adjustably secured to a pusher plate 62 from which a slotted block 65 extends integrally. The slider 61 is slideable on top 29 in a track (not shown) in elongated slotted guide 69. The block 65 extends through the slot 71 of guide 69. The pusher 62 extends from block 65 along the slot 71 into entrance or channel 43 in a position such as to advance each pellet which actuates SW1 into the Gauging Unit. The position of the end of pusher 62 in the entrance 43 may be set by securing the block 65 at the proper position along the slot 73 to the slider 61.

The slider 61 (FIGS. 2 and 7) is driven from the yoke 63 through a pin 75 extending from the yoke 63 and engaging the plate 67 through a suitable low friction fiber (Teflon or nylon) washer 76. The yoke 63 has a slot 77 and is reciprocable by a pin 79 extending eccentrically from a disc 81 rotated by a motor MO2 (FIG. 8A) through a slip clutch 83.

The indexing mechanism 23 also includes a pawl 85 (FIG. 7) suspended to pivot about a pin 87 by which it is secured to a plate 89 extending downwardly from top 29. The other end of the pawl 85 has a lip 91 linked to an armature actuable by pawl solenoid SP (FIG. 7) extending downwardly from the top 29. The pawl 85 has a stop 93 intermediate the pivot 87 and the lip 91 which is adapted to engage pins 95 and 97 displaced along the rim of the disc 81. With solenoid SP deenergized the pawl 85 drops downwardly under gravity so that the stop 93 then engages pin 95 or 97. In this position of the mechanism 23 the motor MO2 rotates but the clutch 83 slides.

The yoke 63 carries a spring 99 which in the forward position of the yoke 63 actuates a limit switch SW3 (FIG. 7) suspended from the underside of the top 29. The limit switch SW3 has a back contact SW3a and a front contact SW3b (FIG. 8A). The yoke 63 reciprocates the pusher 62.

The yoke 63 has an initial or standby position at which pin 97 engages the stop 93 (as in FIG. 7A) and an advanced position in which the pin 95 engages the stop 93.

In the operation of the apparatus the solenoid SP is instantaneously actuated on two occasions during the processing of each pellet. The first actuation releases pin 97 from stop 93 permitting the yoke 63 to cause pusher 62 to move the pellet PE into the Gauging Unit. SP is immediately deenergized after this actuation so that pawl 85 drops down causing pin 95 to be engaged by stop 93. The pusher 62 remains adjacent the pellet PE in the Gauging Unit until the second actuation of solenoid SP. This releases pin 95 resetting the yoke 63 to the initial position. During its motion to the initial position the yoke moves pusher 62 forward so that it pushes the pellet PE out of the Gauging Unit into the Weighing Unit and then returns the pusher 62 to the initial position. The switch SW3 is actuated in the advanced position of the yoke and this operation results in the opening of SW3a and the closing of SW3b (FIG. 7A).

The Gauging Unit is supported from vertical plate 101 secured to the channel 35 which serves as support for the top 29 and from a triangular plate (not shown) secured at right angles to the vertical plate.

The gauging is carried out with the pellet PE on an angle plate 105 of stainless steel. A pellet PE in gauge is urged against the vertical wall 107 of the plate 105 in measuring the length and against the base 109 in measuring the diameter. The surface of the base 109 is coextensive with the belt 21 at the entrance channel 43. The length of each pellet PE is gauged with the aid of linear variable differential transformer LVDT1 (FIG. 7) which is mounted on plate 101 opposite the wall 107. The length feeler 111 extends over base 109 from LVDT1 in a direction perpendicular to the surface 107 and is urged towards this surface by a spring 113 (FIG. 8C). The tip of this feeler 111 operates through a rectangular leaf spring 115 (FIG. 2) which is suspended from the support for LVDT1. The feeler 111 is connected to the core 119 of LVDT1 (FIG. 8C). A solenoid SRE (FIG. 8A) is connected to feeler 111 to retract this feeler when the pellet PE is to be ejected from the Gauging Unit.

The diameter is gauged with the aid of LVDT2 (FIGS. 2, 8C) which is mounted on plate 101 directly over the center portion of base 109. The diameter feeler 121 (FIG. 7) is connected to the core 123 of LTDT2 and is urged in a direction perpendicular to the surface of 109 by a spring 125.

Between gauging operations the feeler 121 is set so that its distance from surface 109 is just smaller than the diameter of diameter pellet PE. Also, at all times, except when the pellet is being ejected from the Gauging Unit, the retract solenoid SRE (FIG. 8A) is deenergized and the feeler 111 is set so that the feeler face of spring 115 is spaced from surface 107 a distance just shorter than the length of the shortest pellet PE. During operation a pellet PE is thrust between the spring 115 and surface 107 and feeler 121 and surface 109 by pusher 62. After the gauging operation the feeler 111 is retracted so that when the pusher 62 pushes the pellet PE out of gauge into the weighing pan 129 of the Weighing Unit the pellet PE is not deflected. The pan 129 is in the form of a V groove and the channel 127 has a generally concave surface 131 (FIG. 3) forming a cylindrical concavity, the axis of which is generally perpendicular to the long dimension of the pan 129. The pellet PE thus moves along the channel 127 into the pan 129 without being turned.

Figure 2:
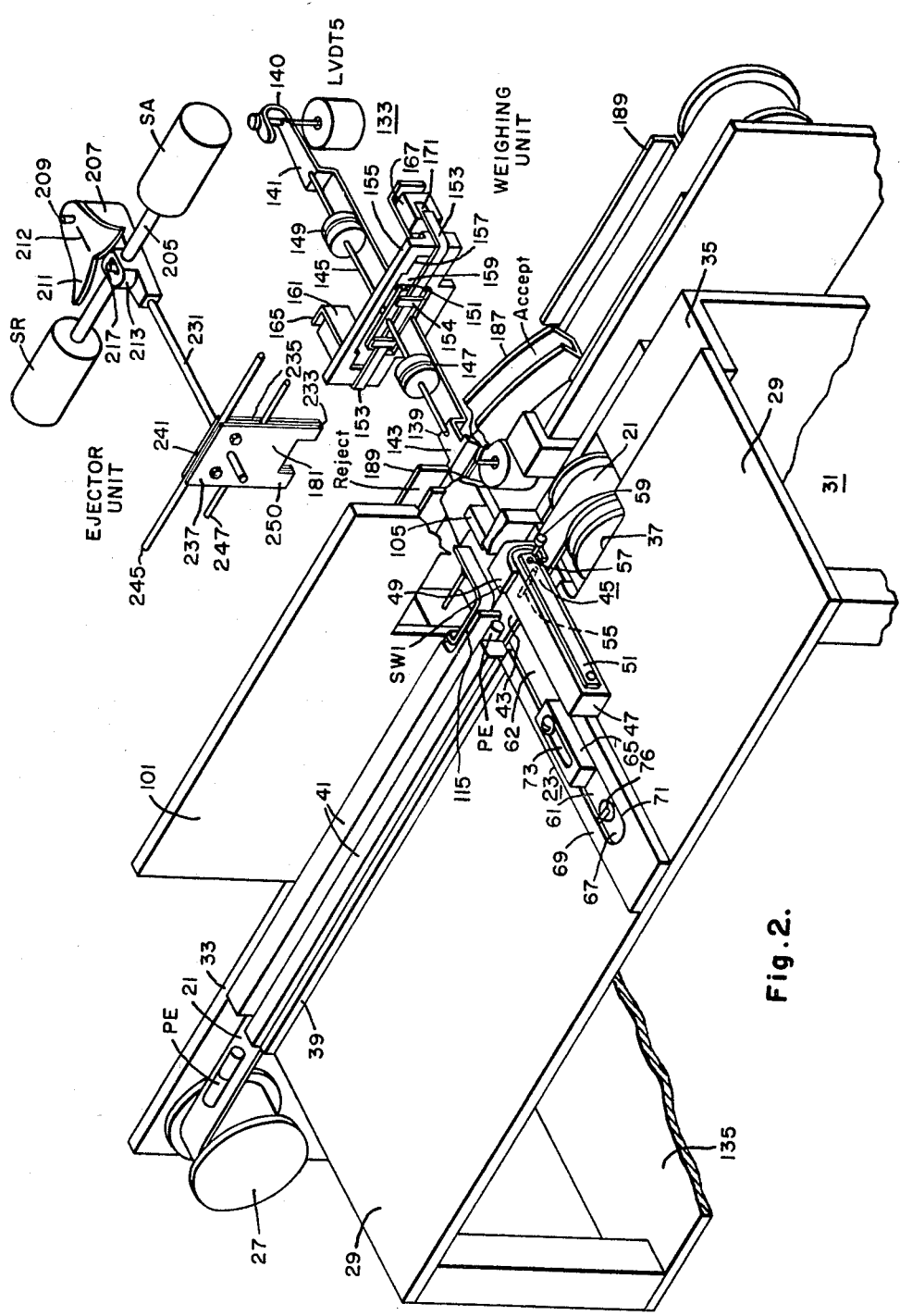
FIG. 2 is a view in isometric partly exploded of the gauging and weighing apparatus according to this invention.

The Weighing Unit (FIG. 9) is mounted between the flanges on one side of an I-beam 133 supported on the lower plate or deck 135 of the table 31. The Weighing Unit includes a generally elongated channel shaped strip 139, the ends of which are bent to form the pan 129 at one end and, at the other end a rigid generally hook-shaped connection 140 to the core 142 of LVDT5 (FIGS. 2 and 8C) through a screw 144 (FIGS. 2, 7). A threaded rod or arm 145 extends between the bent up ends of the strip 139. The arm 145 carries weights 147 and 149 on both sides. These weights may be set along the rod 145 for balancing. Each pair of weights 147 and 149 is separated by a resilient washer 150 and 152 (FIG. 5).

The rod 145 passes through a plate 151 centrally at the upper rim of the plate and is secured to this plate 151 (FIG. 2). The plate 151 serves to support the pivot bearing of the beam 139 which is a band 153 of stainless steel or other metal (about .005 inch thick), engaging the plate 151 in a longitudinal groove and secured to the plate 151 by straps 154 secured to the plate across the ends of the groove.

The beam support is a generally U-shaped bracket 155 having a vertical center portion 157 with a window 159 (FIG. 2) and having legs 161 with bent-over feet or lips 165. The center portion 157 is secured to the web of the I-beam 133 so that it is vertical. The fastening means (not shown) is such as to minimize distortion of the beam 139 from thermal expansion. The legs 161 extend cantilever fashion from the center 157. The beam support also includes stirrups 167 in the form of blocks. Each stirrup 167 is seated in leg 161 adjacent the associated lip 165 and is moveable along the leg by a screw 169 which passes through the associated lip 165 and screws into the stirrup. Each stirrup 167 also has a hole 171 (FIG. 2) near the end adjacent the center 157. The band 153 wraps around the rounded edges of the center 157 of the bracket 155, passes through the holes 171 and is secured to the ends of the stirrups 167 adjacent the center 157. The band 153 is tensioned by moving the stirrups towards the lips 165. The plate 151 is free to pivot about its longitudinal axis in the window 159 as the beam 139 reflects and the band 153 is thus torsioned by the deflection of the beam and serves as a highly effective scale bearing. The torsion is very small; about 6 minutes. The deflection of the beam 137 is limited by yokes 173 (FIG. 5) which extend over the beam 139 near the ends where the beam is bent.

The weighing is effected by balancing the scale. For this purpose a balancing coil 175 (FIGS. 2 and 8C) is provided to reset the pan 129 to the balanced position. The coil 175 acts on a permanent-magnet core 177 connected to the pan 129. A trimming coil 179 (FIG. 8C) is also coupled to the core 177 for precise setting. The trimming coil 179 and balancing coil 175 are mounted in the web of the I-beam 133 just under the pan 129 and the core 177 extends from the center of the pan 129 through the coils 175 and 179.

The pellets PE are ejected from the pan 129 along the Accept or Reject Channels by operation of the flipper 181 of the Ejector Unit (FIG. 2) in one direction or the other. The Ejector Unit is shown in FIG. 2 in sufficient detail for the understanding of the invention disclosed herein. Reference is made to Patent 3,221,152 for a more complete understanding. The Accept Channel includes a guide 187 communicating with the pan 129 along with the accepted pellets PE move and the Reject Channel includes a like guide 189.

The Ejector Unit is supported on a table (not shown) itself mounted on the plate 135 of table 31. This unit includes accept solenoid SA and reject solenoid SR (FIGS. 2, 8A). The solenoids SR and SA have a common plunger 205 which is displaceable in one direction or the other on energization of one of the solenoids.

The Ejector Unit also includes a bracket 207 pivotally supported on a pin 209 and having thereon a double cam 211, the cam surfaces of which are symmetrical with respect to the axis 212 through the center of pivot at pin 209. The plunger 205 has a slotted block 213, the slot 215 of which is engaged by a pin 217 extending from the cam bracket 207.

The cam 211 is resiliently held centered along the axis 212 by a roller (not shown) which is urged against the joint between the cam surfaces by spring (not shown) acting on a pivotally mounted bar or arm (not shown) on the free end of which the roller is mounted. Energization of one of the solenoids SA or SR causes the cam 211 to pivot against the force of the spring. When this solenoid is deenergized the cam 211 is again centered by the roller.

A limit switch SW4 (FIG. 8A) is suspended over the Ejector Unit so as to be actuated when the cam 211 is pivoted in either direction. This switch SW4 has a normally closed (front) contact which is actuable to open when the cam 211 is pivoted in either direction. The opening of the contact of limit switch SW4 signals the end of a processing operation for a pellet PE and resets the apparatus for processing the next pellet.

A drive rod 231 (FIG. 2) extends from the bracket 207. This rod 231 is connected to the flipper 181 (FIGS. 2, 4 and 6) to move the flipper to deposit a pellet PE from the pan 129 in the Accept Channel or Reject Channel depending on whether the accept solenoid SA or the reject solenoid SR is actuated.

The flipper 181 (FIGS. 5 and 6) is of composite structure and is made up of a center plate 233 on each side of which there is a plate 235 and 237, respectively. The rod 231 engages the center plate 233 substantially at its center and passes through clearance holes (not shown) in the outside plates. The outside plates 235 and 237 extend above and below the center plate 233 forming channels. The channels are engaged by guide rods 245 and 247 on which they ride. The plates 235 and 237 extend below the rod 247 and hold a strip 248 of rubber (neoprene) having fingers 250 at its tip. The fingers 250 extend into the pan 129 so as to eject a pellet PE in the pan when rod 231 is moved. Brushes (not shown) may be attached to the tips of the fingers 250 to clear the pan 129 of chips.

The Volume Deviation Unit includes potentiometer PL (FIG. 8B) for setting an analogue of the length of the pellet PE, potentiometer PD for setting an analogue of the diameter, and potentiometers PLD and $PLD^2$ for computing an analogue of the volume. These potentiometers are connected to be supplied with direct-current voltage of the order of 25 volts between conductors or buses DL1 and DL2. In normal operation this supply draws about 400 milliamperes and is regulated to ±.05%. An intermediate electrical point of this supply is grounded (PC). This point is determined by a voltage divider including resistors R1 and R3 between which potentiometer P6 is interposed.

The length potentiometer PL is connected in a bridge network BR1 including resistors R5 and R7 and the branches of PL. This network BR1 is connected between DL1 and DL2 through a resistor R21. The output conjugate terminals of the network BR1 are the adjustable arm of PL and the junction of R5 and R7. These terminals are connected across a meter M1 through a fixed resistor R23 and a potentiometer P1.

The arm of PL is controlled by a cam CL1 rotatable by a servo motor SM1 (FIG. 11C). The motor SM1 has fields SM1F1 and SM1F2. Field SM1F1 is controlled from the Program Unit and is supplied during the gauging interval through contact RL4d of delay relay RL4. Field SM1F2 is supplied with an unbalance during a gauging operation. To compensate for the unbalance the Volume Deviation Unit includes LVDT3.

The primaries Z1 and Z3 of LVDT1 are supplied with an alternating potential from the same supply as SM1F1 through transformer T41, the secondary S71 of which typically supplies about six volts to Z1 and Z3. The primaries Z5 and Z7 are continuously supplied from the available supply usually through a transformer (not shown). LVDT1 is thus energized only during the gauging interval. The secondaries S1 and S3 are connected in series bucking relationship to the input of an amplifier A1. The output of this amplifier A1 is connected to supply field SM1F2. The core 301 of LVDT3 is connected to be controlled by cam CL1 together with the arm of PL.

LVDT1 is set by a factory or service adjustment so that the bridge BR1 in which PL is connected is balanced for a pellet PE of standard length. When a pellet of non-standard length is in gauge the potential of PL with respect to ground is negative if the length is less than standard and positive if it is higher than standard. The meter M1 measures the length deviation.

The diameter potentiometer PD is connected in a network BR3 similar to BR1 and the output conjugate terminals of the network BR3 are likewise connected to a meter M2. The bridge BR3 is supplied from DL1 and DL2 through a resistor R27. The setting of PD at its most negative point corresponds to 97½% of standard diameter and the setting of PD at its most positive point corresponds to 102½% of standard diameter. Bridge BR3 is balanced for standard diameter. The meter M2 measures the diameter deviation.

Potentiometer PLD (FIG. 8B) is connected through a resistor R29 between the arm of PL and DL2 and PLD² through a resistor R31 between the arm of PLD and DL2. The arms of PD, PLD and PLD² are operable together from a cam CL2 rotatable by motor SM2 which has fields SM2F1 and SM2F2 (FIG. 8C).

The Volume Deviation Unit includes LVDT4. The primaries Z9 and Z11 of LVDT2 are connected to be supplied in parallel with primaries Z1 and Z3 and the primaries Z9 and Z11 of LVDT2 are connected to be supplied in parallel with Z5 and Z7 from the alternating supply. The secondaries S5 and S7 are connected in series bucking to the input of amplifier A3. The output of amplifier A3 supplies field SM2F2. The core 305 of LVDT4 is connected to cam CL2 to be positioned with the arms PD, PLD, PLD². With BR1 and BR2 balanced, PLD² produces the voltage analogue of standard volume.

The potential on the arm of PLD² is balanced against the voltage derivable between the arm of P6 and ground (FIG. 8B). The arm of P6 is connected to the arm of PLD² through meter M3, a potentiometer P3 and a resistor R33. P6 is set so that when PLD² is at standard volume, the potential between PLD² and ground is zero. The meter M3 measures volume deviation.

The Weight Deviation Unit includes an audio frequency power supply and an amplifier A5 (FIG. 8C). The audio frequency is about 2000 cycles per second and is derived from an oscillator O including double triode 1TU. The output of the oscillator O is connected to the input of a cathode-follower including tube 2TU; the output of the cathode-follower controls a power pentode 3TU. The power pentode 3TU feeds the supply transformer T1 having primary Z17 and secondaries S9 and S11. The supply includes an automatic volume control circuit AV which includes diode 4TU and triode 5TU. Triode 5TU controls the level of the cathodes 305 of 1TU. 5TU and 2TU may be a double triode.

The amplifier A5 includes a low-impedance-input amplifier circuit including transistor TR1. The output of this circuit is amplified by cascade amplifier including tubes 6TU and 7TU and power pentode 8TU.

The Weight Deviation Unit also includes a demodulator DM. Opposite conjugate terminals of demodulator DM are supplied through a network including a capacitor C1 and a resistor R35 from the secondary S13 of the output transformer T2 of amplifier A5. The other opposite conjugate terminals are supplied from secondary S11 of transformer T1. The primary Z19 of LVDT5 is supplied from the secondary S9 of T1. The primary is loaded by P11. The secondaries S15 and C17 are connected bucking to the input (base of TR1) of amplifier A5 through DC blocking capacitor C3 and through feedback resistor R41. R41 is adapted to be supplied from feedback secondary S23 of transformer T2 through a resistor R43 and switch SW7. With switch SW7 closed negative stabilizing feedback is injected into the input circuit of A5. Such feedback is used ordinarily when the scale is used alone; when the scale is used in the complete system SW7 is open. Alternating current from P11 is also injected through SW6 and R45 to counteract spurious current.

The output of DM produces a potential which in polarity and magnitude is dependent on the phase and amplitude of the output of A5. Thus the output of DM is a direct-current potential which in amplitude measures the extent of the displacement of the core 142 and in polarity indicates the direction of displacement from an initial setting.

When the pellet PE drops into the pan 129 a sharp impulse is produced on the weighing mechanism. Such an impulse would tend to cause hunting of the weighing mechanism. An important feature of this invention is the impressing on the weighing coil 175 (FIG. 8C) from DM of a damping impulse which suppresses the hunting. This damping impulse is short but of very high amplitude compared to the impulse impressed by the pellet PE; the ratio being of the order of 1,000,000 to 1. The power pentodes 3TU and 8TU would tend to produce instantaneous power of this relative magnitude.

The output of DM is adapted to be connected to the adjustable arm of a potentiometer P21 through the weighing coil 175, the switch SW5, a resistor R51 and a front contact RCa of a comparison relay RC in the Program Unit (FIG. 8B). The potentiometer P21 is connected to ground through potentiometer P23 and is also connected across the weight deviation meter M4 through a resistor R53. P21 is shunted by a resistor R55. A filtering capacitor C21 is connected between the arm of P21 and ground.

The density deviation meter M5 is connected to measure the potential between the arm of P23 and the arm of PLD². This connection includes front contact RCb of relay RC, the meter M5, a fixed resistor R57 and a variable resistor or potentiometer P25. This potential is the analogue of the difference between the weight deviation and the volume deviation and is the density deviation.

The mechanical impact which the pellet PE produces as it drops into the pan 129 serves to produce an electrical impulse. This electrical impulse controls the activating of the Program Unit to produce the processing of the pellet PE following its weighing. To derive the impulse the potential pulse produced at weighing coil 175 when the pellet PE drops into the pan 129 is impressed through coupling capacitor C31 in the input of a cascade amplifier which includes tubes 9TU and 10TU (FIG. 8B). These tubes may be parts of a double triode. The output of this amplifier is impressed through capacitor C33 in the grid circuit of the scale thyratron 11TU (FIG. 8A) in the Program Unit rendering the latter conducting and actuating the scale relay RL3 and the compare relay RC.

The meters M1, M2 and M5 have limit contacts 401 and 403, 405 and 407, and 409 and 411, respectively (FIG. 8B). A moveable contact 413, 415, 417, respectively, cooperates with each pair of limit contacts. Each contact 413, 415, 417 is actuable by the meter coils 419, 421, 423, respectively. Once a contact 413, 415, 417 engages an associated limit contact 401, 403 or 405, 417, or 409, 411 it is held in engagement by a holding coil 425, 427, 429, respectively. Contact 413 engages 401 when the length exceeds the upper length limit (typically is 110% of standard length) and engages 403 when the length is lower than the lower length limit (90% standard length). Contact 415 engages 405 when the diameter exceeds the upper limit (102.5% standard) and 407 when the diameter is below the lower limit (97.5% standard). Contact 417 engages 409 when the density exceeds the upper limit (102.5% standard) and 411 when the density is below the lower limit (97.5% standard).

The holding coils 425, 427, 429 are energized from conductors DP and DN and common conductor DO which supply direct current of opposite polarities derived from transformer T21 in the Program Unit through rectifiers 431 and 433. The primary Z41 of T21 is adapted to be energized from the alternating current bus L through an "Automatic" contact SW11b of the manual-automatic switch SW11 and through front contact RL6a of the delay relay RL6 in the Program Unit. Once one of the limit contacts of M1, M2 or M5 is closed it then remains closed as long as RL6 is actuated and that is until after the completion of the accept-reject operation.

Each contact 401, 403, 405, 407, 409, 411 is connected to the associated lock in bus DP or DN through a relay RL11, RL13, RL15, RL17, RL19 and RL21, respectively. Each relay RL11 through RL19 has front contacts RL11a, RL13a, RL15a, RL17a, RL19a, RL21a and RL11c through RL21c and a back contact RL11b through RL21b, respectively. The front contacts RL11a through RL21a connect bus L to the reject bus RL when the associated relay is actuated (FIG. 8B). This energizes the reject relay RL7 in the Program Unit through back contact RL9b. Thus once one of the relays RL11 through RL21 is actuated RL7 is actuated to produce a pellet reject operation. Each pair of back contacts RL11b and RL13b, RL15b and RL17b, RL19b and RL21b are connected in series with a signal lamp G1, G2, G3, respectively, and the secondary S51, S53, S55, respectively of a transformer T23, T25, T27, respectively, which is energized between L and ground. The lamps G1, G2, G3 indicate that a pellet PE under processing has normal dimensions or density. When any of the relays RL11 through RL21 is actuated the associated lamp is deenergized to indicate an abnormality. Each of the contacts RL11c through RL21c when closed connects a counter CO1 through CO11 between L and ground. The number of pellets with excessively large or small lengths, diameters or densities is thus counted.

The Program Unit includes in addition to thyratron TU11, the servo thyratron TU12 and the delay thyratron TU13. In addition the Program Unit includes the relays RL1, RL2, RL3, RL4, RL5, RL6, RL7, RL8, RL9, RC and RAJ. Generally stated these relays have the following functions.

RL1—Starting relay—starts the pellet selecting process.
RL2—Pellet-in-gauge relay—actuated when pellet PE is being gauged.
RL3—Scale relay—actuated during weighing operation by dropping of pellet PE in pan 129.
RC—Compare relay—actuates the Density Deviation Unit to carry out a comparing operation.
RL4—Servo relay—enables the servo motors SM1 and SM2.
RL5—Pawl relay—actuates to move pellet PE from gauge into weighing pan.
RL6—Delay relay—delays sequencing until after servo motors stop.
RL7—Off standard relay—actuated if dimensions or density of pellet is beyond standard limits.
RL8—Accept relay—operates to accept pellets within limits.
RL9—Reject relay—operates to reject pellets outside limits.
RAJ—Anti-jam relay—prevents transfer of a succeeding pellet with a preceding pellet in gauge.

The contacts of the above-listed relays bear coded identifications. The identification of each contact includes the identification of the relay plus a lower-case letter.

The Program Unit is energized from the alternating power bus L and from a direct current bus DL11 which may derive its power from L through rectifiers (not shown). Typically DL11 may operate at about 150 volts direct-current and L at about 115 volts alternating-current.

Preparatory to the use of the apparatus the disconnect switches or circuit breakers (not shown) for the apparatus are closed and power is applied. The master and slave LVDT's, LVDT1 and LVDT3 and LVDT2 and LVDT5, respectively, are set so that the computer potentiometers PL and PD are centered to correspond to dimensions of a standard pellet PE and the meters M1, M2 and M3 read zero.

The apparatus may now be set in standby by closing switch SW and setting switch SW11 on automatic. In standby MO1 and MO2 are energized and belt 21 is then moving. Disc 81 is prevented from moving. Switch SW1 is open so that RL1 is deenergized. Switch SW3 is unactuated so that RL2 is deenergized. After the apparatus is set up SW4 is opened so that 11TU, RL3 and RC are deenergized. Meters M4 and M5 are disconnected from the scale 137 by RCa and RCb. With RL2 deenergized 12TU and RL4 are deenergized and C43 is charged. With RL4 deenergized fields SM1F1 and SM2F1 and primaries Z1 and Z3 and Z9 and Z11 are deenergized. With RL4 deenergized C51 is discharged and RL5 is deenergized. With RL3 deenergized RL3d is closed and C53 is discharged. 13TU is maintained nonconducting by AC bias. RL6 is deenergized. With RL6 deenergized RL6a is open and the meter lock-up transformer T21 is deenergized. Also C61 is discharged. With the meters M1, M2 and M5 at zero RL11, RL13, RL15, RL17, RL19 are deenergized and the reject bus LR and RL7 are deenergized. With C61 uncharged RL8 and RL9 are deenergized. CO13, CO15, SA and SR are then deenergized. With RL2 deenergized RAJ is deenergized and the apparatus is conditioned to gauge a pellet PE. Also with RL1 and RL5 deenergized and with SW3 unactuated SP and SRE are deenergized. The Gauging Unit is then set to receive and gauge a pellet PE.

To operate the apparatus pellets PE are deposited in succession on belt 21. The first pellet PE actuates switch SW1 when it arrives in position to be placed in gauge. RL1 is then actuated. This energizes solenoid SP causing the pawl 63 to advance to its intermediate position injecting pellet PE in gauge. Since SW3 is at the beginning of this operation unactuated SRE remains deenergized. At the close of this operation SW3 is actuated. The actuation of SW3 opens SW3a actuating RL2 and opening RL2a and deenergizing SP and also, at this point, preventing energization of SRE through SW3b which is now closed. RL2b closes actuating RAJ which is locked in through RAJa. RAJb opens preventing the next pellet PE from being injected into gauge by actuation of RL1.

RL2c now opens and RL2d closes rendering 12TU conducting and energizing RL4. The closing of RL4a and the opening of RL4b charges capacitor C51. The opening of RL4c and the closing of RL4d locks 12TU in conducting condition. The closing of RL4d also applies power to SM1F1, SM2F1, Z1 and Z3 and Z9 and Z11. The unbalance produced in LVDT1 and LVDT2 causes amplifiers A1 and A3 to supply outputs to SM1F2 and SM2F2 which consist of a commercial frequency potential superimposed on direct-current potential. Motors SM1 and SM2 now rotate so that the slave LVDT's, LVDT3 and LVDT4 counteract the unbalance produced in LVDT1 and LVDT2, respectively, by the length and diameter deviations of the pellet PE in gauge. C43 is so selected that its discharge through R125 maintains 12TU actuated long enough to achieve the balance. When the balance is achieved amplifiers A1 and A3 supply only DC to SM1F2 and SM2F2 dynamically braking motors SM1 and SM2 so that they stop instantaneously. Thereafter the current flow through R125 is reduced so that 12TU becomes non-conducting.

With the motors SM1 and SM2 stopped the potentiometers PL and PD are in the positions set by cams CL1 and CL2, respectively. Meters M1, M2 and M3 now have readings corresponding to these settings. If pointer 413 or 415 is in engagement with contacts 401 or 403 or 405 or 407 it remains so engaged.

When 12TU is rendered non-conducting RL4 is deenergized resetting RL4c and RL4d so that SM1F1 and SM2F2, Z1 and Z3 and Z9 and Z11 are deenergized and 12TU is locked in deenergized condition. RL4a now reopens and RL4b recloses energizing RL5 for a short time interval. RL5a closes momentarily actuating SP and SRE. The pawl 63 is now returned to its initial setting on the way resetting SW3. The pellett PE receives an impact causing it to roll down guide 131 and to drop in pan 129. The resulting impulse renders 11TU conducting actuating RL3 and RC. 11TU, RL3 and RC remain actuated until SW4 is opened. The resetting of master LVDT's, LVDT1 and LVDT3 does not affect the settings of PL and PD because RL4 is open and there is no power in SM1F1 or SM1F2.

RL3a opens preventing energization of SP. RL3d opens permitting C53 to charge at a rate predetermined by P51.

In the meantime SW3a recloses deenergizing HL2. RL2a recloses but SP remains unaffected because RL3a is open. RL2b reopens but RAJ is locked in at RAJa. RL2c and RL2d are reset conditioning 12TU for a succeeding operation. The opening of SW3b permits SRE to be reset.

The actuation of RC closes RCa and RCb causing a weighing operation and a density-deviation determining operation to be carried out. If the density is beyond the set limits pointer 417 closes contact 409 or 411.

While this comparing operation has been proceeding C53 has been charging. After adequate time for comparison 13TU is rendered conducting and RL6 is actuated. The closing of RL6a energizes T21. If any of the meter contacts 413, 401, 403; 415, 405, 407; 417, 409, 411 are closed, one or more the relays RL1 through RL21 are energized, LR is energized and the character of the deviations is recorded. With LR energized RL7 is actuated. If the pellet PE is within the specification RL7 remains unactuated.

The closing of RL6a and the opening of RL6b also actuates RL8 or RL9 depending on whether or not RL7 is actuated. CO15 or CO13 and SR or SA are then energized, operating the ejector 237 to move the pellet PE from the pan 129 into the Reject or Accept Channel. SW4 is then opened deenergizing 11TU and resetting RL3 and RC.

The closing of RL6a also provides a shunt circuit through rectifier 501 and resistor R155 around the coil of RAJ and RAJ is reset. This actuates RL1 and with RL3 reset another pellet is injected into gauge.

When RL3 is reset RL3d recloses discharging C53 and rendering 13TU non-conducting. RL6 is reset. This deenergizes T21 resetting RL7, RL8, RL9, SA and SR and conditioning all counters for the next count. The apparatus is now ready to process the next pellet PE.

It has been found that this apparatus can be used to process pellets at a rate of about 50 times the rate which could be achieved prior to this invention.

While preferred embodiments of this invention are disclosed herein many modifications thereof are feasible. This invention then is not to be restricted except insofar as is necessitated by the spirit of the prior art.

I claim as my invention:

1. Apparatus for determining the deviation of the density of an object from a standard density including a gauging station, for determining the volume of each said object, a weighing station for weighing each said object, indexing means, pulse responsive means connected to said indexing means for actuating said indexing means to advance an object, means connected to said pulse responsive means for supplying pulses at least in pairs thereto, the first of each pair actuating said indexing means to advance an object into one of said stations and said second pulse of said pair actuating said indexing means to advance said object from said one station to said other station, and computer means connected to said gauging station and to said weighing station for determining the deviation of the density of said object from a standard density.

2. Apparatus for determining the dimensions and weight of an object comprising a gauging station, including means to be connected to said object for determining its dimensions, a weighing station including means for weighing said object, indexing means capable of exerting a mechanical force on said object but unlocked therefrom for advancing said object, means responsive to the absence of an object from one of said stations for actuating said indexing means to exert a force on said object to advance said object to said one station, and means responsive to the completion of the processing of said object in said one station for actuating said indexing means to again exert a force on said object to advance said object from said one station to said other station, said object being disengaged from said indexing means in each of said stations.

3. Apparatus for determining the density of an object comprising a dimension gauging station including means for determining the dimensions of said object to determine its volume, a weighing station including weighing means for weighing said object, indexing means of the type that has a standby condition and a first condition and is actuable to pass through a cycle from said standby condition to said first condition and back to said standby condition, said indexing means operating by exerting advancing forces on said object throughout said cycle but being mechanically unlocked from said object throughout said cycle, means connected to said indexing means for actuating said indexing means from said standby to said first condition, means responsive to said indexing means as it is actuated from said standby to said first condition to exert a force on said object for advancing said object to one of said stations, means connected to the means included in said one station and to said indexing means and responsive to the completion of the processing of said object at said one station for actuating said indexing means from said first condition to said standby condition, said indexing means again exerting a force on said object for advancing said object from said one station to said other station as said indexing means is so actuated, said object being disengaged from said indexing means in each of said stations, and computer means connected to said dimension determining means and to said weighing means for determining the density of said object.

4. Apparatus for determining the dimensions and weight of an object having opposite bases generally perpendicular to an axis of said object comprising a gauging station, for determining dimensions of said object, a weighing station for determining the weight of said object, means for moving said object from one of said stations to the other, a channel between said stations over which said object passes from one of said stations to the other, said channel having a concaved curved surface between said stations, said surface concaving away from said object as it moves between said stations, so that said object is engaged only at its bounding edges of its bases by said surface whereby said object is constrained to pass from one of said stations to the other in a direction generally perpendicular to its axis.

5. The apparatus of claim 4 for determining the dimensions and weight of a generally cylindrical object having an axis and wherein the weighing station includes a receptacle at a lower level than the gauging station, and wherein the object is capable of rolling along the channel under gravity in a direction generally perpendicular to said axis from said gauging station to said receptacle, the curved surface of the channel engaging the object substantially only along the peripheries of its bases.

6. The apparatus of claim 4 including indexing means having means to engage said object for advancing said object, means connected to said indexing means for advancing said object into the gauging station, and means connected to said indexing means responsive to the completion of a gauging operation on said object for imparting an impact to said object to launch said object along the channel between the stations to move it into said weighing station.

7. The apparatus of claim 4 for determining the density of an object including computer means connected to the gauging and weighing stations, for determining the density of the object from its dimensions and weight.

8. A processing system for determining the dimensions and weight of an object including at least first processing means and second processing means for producing successively first and second actions respectively on said object, one of said processing means determining the dimensions of said object and the other of said processing means determining the weight of said object, and sequencing means connected to said processing means for sequencing the advance of said object through said first and second processing means and for actuating said processing means respectively to determine the dimensions and weight of said object, said other processing means including a member on which said object is dropped on entering said other processing means and said object producing a mechanical impact on being dropped on said member, means connected to said member for deriving an electrical impulse from said impact, means connected to said deriving means and to said sequencing means and responsive to said impulse for actuating said sequencing means to actuate said other processing means to determine the weight of said object.

References Cited by the Examiner
UNITED STATES PATENTS

| | | | |
|---|---|---|---|
| 2,065,888 | 12/1936 | Du Brul et al. | 209—75 X |
| 2,384,518 | 9/1945 | Aller | 209—75 |
| 2,689,082 | 9/1954 | Kolisch | 177—25 X |
| 3,107,788 | 10/1963 | Thiele et al. | 209—75 |
| 3,110,400 | 11/1963 | Early | 209—75 X |

RICHARD C. QUEISSER, *Primary Examiner.*

JULIUS FISHER, *Assistant Examiner.*